R. KIRKWOOD.
LIQUID GAGE.
APPLICATION FILED AUG. 2, 1916.
1,224,752.
Patented May 1, 1917.
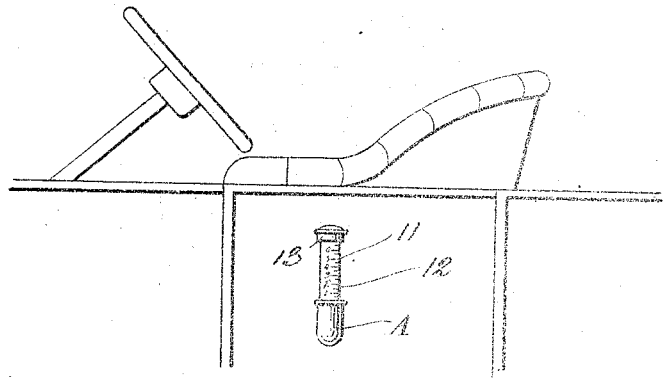
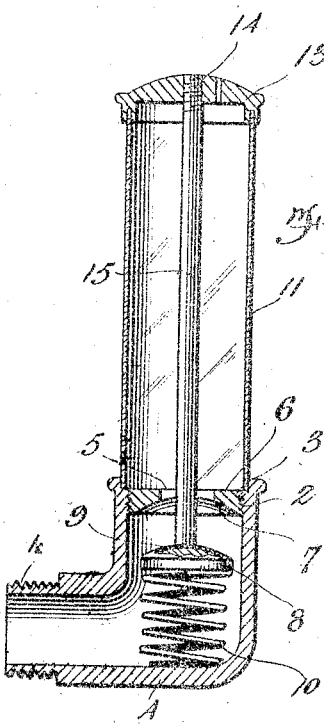
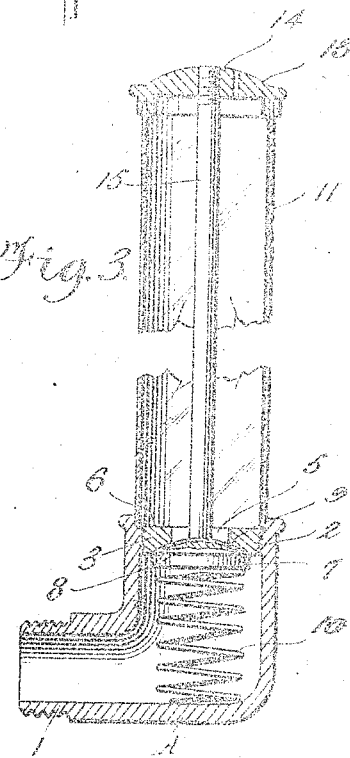
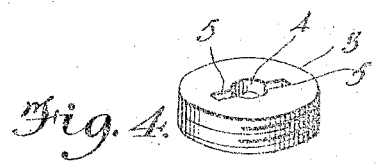
Witnesses
Frederick W. Ely
Edwin D. [Jones]
Inventor
Ramey Kirkwood
By Victor J. Evans
Attorney

UNITED STATES PATENT OFFICE.

RAMEY KIRKWOOD, OF ABBEVILLE, SOUTH CAROLINA.

LIQUID-GAGE.

1,224,752.     Specification of Letters Patent.     Patented May 1, 1917.

Application filed August 2, 1916. Serial No. 112,790.

*To all whom it may concern:*

Be it known that I, RAMEY KIRKWOOD, a citizen of the United States, residing at Abbeville, in the county of Abbeville and State of South Carolina, have invented new and useful Improvements in Liquid-Gages, of which the following is a specification.

This invention relates to measuring instruments and has particular application to a liquid gage for measuring liquid such as gasolene or the like within a tank, I having shown my invention used in connection with a gasolene tank of an automobile.

The chief characteristic of this invention resides in the provision of a device of the above described character in which a portion of the gage is formed of transparent material whereby the amount of liquid within the tank may be readily determined, the gage being formed with improved means whereby upon breaking the transparent portion, the flow of liquid to the gage will be automatically shut off, thereby preventing the accidental waste of the liquid.

Another object of this invention is to provide a device of this character in which the cut off means is in the form of a spring pressed valve, the valve and valve seat being of novel construction whereby the liquid will be positively prevented from flowing through the pipe and out of the gage when the latter is broken.

Another object of this invention is to provide a device of this character which contains the desirable features of simplicity, durability and efficiency and furthermore a gage in which the transparent portion may be readily replaced upon being broken.

Other objects of the invention will appear as the specification is read in connection with the accompanying drawings, in which:—

Figure 1 is a side elevation of the device showing the same arranged upon one end of an automobile seat.

Fig. 2 is a vertical sectional view showing the valve in open position.

Fig. 3 is a vertical sectional view of the valve in closed position, the transparent portion of the gage being partly broken away.

Fig. 4 is a detailed view of the valve seat.

Referring to the drawings in detail, my invention comprises a short section of metal pipe generally indicated as at A, which is in this instance in the form of an elbow. The pipe has one of its ends formed with a reduced portion 1 which is exteriorly threaded whereby the same may be connected to a pipe mounted under the seat of a vehicle, and in communication with the supply pipe, the pipe and tank not being shown, as it is thought that the same is unnecessary. In this instance I have shown the gage arranged upon one end wall of a seat of an automobile whereby the operator of the machine may readily determine the amount of gasolene within the tank. The opposite end of the pipe A is interiorly threaded as at 2 to receive the valve seat 3. The valve seat 3 is provided centrally thereof with a circular opening 4, the walls of which are recessed at diametrically opposite points as at 5. The periphery of the valve seat 3 is formed with a circumferentially extending flange 6 which is adapted to limit the downward movement of the fluid within the pipe while the other side of the seat is of concaved formation as at 7 for a purpose which will be hereinafter described. Mounted within the vertical portion of the pipe A and below the valve seat 3 is a disk valve 8 which has its upper side convexed and covered with suitable material 9 to provide for a fluid-tight seating of the valve. Disposed within the vertical portion of the pipe A and between the valve 8 and the lower wall of the vertical section of the pipe is a coiled retractile spring 10 which is adapted to exert its tension to force the valve within the valve seat 3 as will be understood.

Mounted within the upper end of the pipe A and secured thereto by means of cement or other material is one end of a cylindrical transparent member 11, the member being formed of glass, and provided with the graduations 12. The member 11 is of any suitable length and of such a diameter as to surround the valve seat 3, the latter serving to close the lower end of the member while the upper end of the member is closed by the end wall 13. The end wall 13 is provided centrally thereof with a threaded opening 14 in which is mounted the threaded end of a rod 15. The rod 15 is disposed within the member 11 and extends longitudinally thereof and is of such a length as to project through and beyond the opening 4 of the valve seat 3. It will be evident from the foregoing that as the lower end of the rod 15 projects below the valve seat 3, the valve 8 will be prevented from seating itself within the valve seat 3, as it will be understood that the coiled spring 10 normally forces the valve upwardly. It will be evident therefore that the gasolene or other liquid which flows through the pipe A, the valve 8 being unseated, will flow into the member 11 and thus indicate by means of the graduation 12, the exact amount of liquid or gasolene contained within the tank; this arrangement of elements being clearly shown in Fig. 2 of the drawings, the end wall 13 being provided with a suitable vent opening.

In operation, the pipe A is connected to the supply tank in any suitable manner, the member 11 assuming a vertical position as is shown in Fig. 1 of the drawings. The valve 8 being in open position, the liquid will flow through the pipe A, pass through the pipe 1 and the recesses 5 and subsequently into the member 11 whereby the contents of the tank will be determined as is previously described. In the event that the member 11 is broken as the result of vibration or collision, the rod 15 being carried by the upper end of the member 11, the rod will be removed from the valve seat 3 thus permitting the spring 10 to force the valve in snug engagement with the seat 3 and thus obstructing the recesses 5 whereby the flow of liquid through the pipe will be discontinued and the accidental wasting of the liquid prevented. The valve seat being concaved and the valve convexed, the confronting faces of the valve and valve seat will positively block the passage of liquid through the recesses and thereby form a positive cut-off means for the gage.

To restore the gage to its normal condition, the remaining portion of the member 11 may be readily removed from the upper end of the pipe A whereby a new member may be readily substituted, it being understood that the rod 15 may then be used by removing the same from the disconnected portion of the member 11. As the member 11 is formed of glass, the same may be readily replaced at a small expense and the use of the gage again restored.

It is thought from the foregoing taken in connection with the accompanying drawings, that the construction and operation of this device will be apparent to those skilled in the art without further description, and that minor changes in size, shape, and proportion and minor details of construction may be made without departing from the spirit and scope of the appended claims.

What I claim is:—

1. A liquid gage embodying an elbow, a valve seat arranged in one end thereof, a glass tube rising from said end of the elbow, a spring pressed valve disposed beneath said seat, a cap closing the upper end of said tube, and a rigid element carried by said cap, and depending therefrom through the valve seat for holding the valve normally unseated.

2. A liquid gage embodying an elbow, an apertured disk arranged in one end thereof and constituting a valve seat, a glass tube having one end fitted within one end of the elbow immediately above the seat, a spring pressed valve disposed beneath the seat, a cap closing said tube, and a rigid element carried by the cap and disposed within the tube, said element passing through the aperture in said disk for holding the valve normally unseated.

3. A liquid gage embodying an elbow having a reduced exteriorly threaded end portion, being interiorly threaded at its opposite end, a disk threaded in the last mentioned end and constituting a valve seat, said disk having an enlarged central opening, and relatively small opposed recesses at opposite sides of the opening, a glass tube rising from the elbow from a point above said seat, a closure for the upper end of the tube, and a rigid element depending from the cap and passing through the central opening in said seat for normally holding the valve unseated.

In testimony whereof I affix my signature.

RAMEY KIRKWOOD.